United States Patent [19]

Tomisaka et al.

[11] 4,367,082
[45] Jan. 4, 1983

[54] AIR SEPARATING SYSTEM

[75] Inventors: Yasushi Tomisaka, Kobe; Yuji Horii, Nishinomiya, both of Japan

[73] Assignee: Kabushiki Kaisha Kobe Seiko Sho, Kobe, Japan

[21] Appl. No.: 273,393

[22] Filed: Jun. 15, 1981

[30] Foreign Application Priority Data

Jun. 14, 1980 [JP] Japan .................................. 55-80635

[51] Int. Cl.³ .............................................. F25J 3/04
[52] U.S. Cl. ......................................... 62/13; 62/18; 62/38
[58] Field of Search ...................................... 62/13–15, 62/18, 38, 39

[56] References Cited

U.S. PATENT DOCUMENTS

| | | | |
|---|---|---|---|
| 2,337,474 | 12/1943 | Kornemann et al. | 62/18 |
| 2,617,275 | 11/1952 | Goff et al. | 62/14 |
| 2,643,527 | 6/1953 | Keith | 62/13 |
| 2,802,349 | 8/1957 | Skaperdas | 62/18 |
| 2,827,776 | 3/1958 | Karwat | 62/18 |
| 3,416,323 | 12/1968 | Heinik | 62/18 |

Primary Examiner—Norman Yudkoff

Attorney, Agent, or Firm—Oblon, Fisher, Spivak, McClelland & Maier

[57] ABSTRACT

An air separating system, including: at least three impurity adsorbers connected with each other by a number of on-off and follower valves and located in air supply conduits leading from an air cooling tower for water-cooling the feed air to reversing heat exchangers of the system; an expansion turbine for producing chill necessary for the system; turbine output gas conduits for feeding part of output gas of the expansion turbine to one of the impurity adsorbers through the heat exchangers; regenerating gas conduits for feeding to another adsorber the outflow of the turbine output gas from the first adsorber after heating; and a cooling water circuit for circulating cooling water between a water cooling tower for cooling the cooling water against waste nitrogen gas to be discharged from the system through the heat exchangers and the air cooling tower; the feed air from the air cooling tower being supplied to the heat exchangers in operation through at least one of the impurity adsorbers, while discharging part of the turbine output gas through the remaining adsorbers which are connected in series by the on-off and follower valves and the regenerating gas conduits.

4 Claims, 2 Drawing Figures

AIR SEPARATING SYSTEM

BACKGROUND OF THE INVENTION

1. Field of the Invention

This invention relates to an air separating system, and more particularly to an air separating system of the type which rectifies and separates oxygen and nitrogen by a double-column fractionating tower after cooling compressed feed air by reversing heat exchangers and which is provided with adsorbers for removing moisture, carbon dioxide and hydrocarbons such as carbon dioxide and acetylene and other impurities from the feed air by adsorption.

2. Description of the Prior Art

As an example, there has been known an air separating system such as illustrated in FIG. 1, where the feed air which is compressed to a predetermined pressure by a compressor 2 is precooled in an air cooling tower 3 and then fed to one of first and second adsorption columns 10a and 10b (e.g., to the adsorption column 10a) for the removal of moisture and impurities such as carbon dioxide. The purified air is cooled almost to its dew point by reversing heat exchangers 15 and fed to a lower column 16a of a double-column fractionating tower 16 for refinement and separation of oxygen and nitrogen, while drawing off excess nitrogen from a middle portion of upper column 16b. The excess nitrogen gas is partly released into atmosphere as waste nitrogen after heating to room temperature through heat exchanger 15, and further heated and partly fed to the other adsorption column (e.g., the adsorption column 10b) to serve as a regeneration gas. However, the air separating system of such arrangements is as a whole held in a highly pressurized stage due to the resistance of the adsorption column which uses the waste nitrogen gas for its regeneration, giving rise to the problem that the pressure of the feed air has to be raised to a level markedly higher than in a current air separation system without impurity adsorption columns. More specifically, the impurity adsorber of the type mentioned above requires a regenerelation gas pressure differential of about 0.3 $Kg/cm^2$ across the adsorption column, which means an increase of about 0.7–0.8 $Kg/cm^2$ in the pressure of the feed air which is generally about 5.0 $Kg/cm^2$ G in an air separating system without impurity adsorption columns. Namely, the compressed feed air has to be supplied at a pressure of 6.0–6.4 $Kg/cm^2$ G, which causes an increase of about 8–10% in the power necessary for the compression of the feed air. Such a pressure increase can be avoided by providing a blower for the regeneration gas. However, as a matter of fact, the blower-regeneration system is not generally accepted partly because of the complication of the system arrangements and partly because of the unreliability of the blower, although the power required for the operation of the blower is small enough.

In an air separation system with impurity adsorption columns as mentioned above, it is the general practice to precool the feed air to about 5° C. to avoid the use of an adsorption unit of a large scale and to prevent increases in running costs. Nevertheless, the feed air is usually precooled by a refrigerator (ammonia or freon) which requires power of about 400 kw in a plant of a scale of 20000 $Nm^3/h(O_2)$.

SUMMARY OF THE INVENTION

It is an object of the present invention to solve the problems which arise as a result of the equipment of impurity adsorption columns in an air separation system as mentioned hereinbefore. A more particular object of the present invention is to provide an air separation system which reduces the installation cost of the impurity adsorption columns as well as the running costs of the system as a whole.

According to the present invention, the foregoing objects are achieved by an air separating system which includes at least three impurity adsorbers connected with each other by a plurality of on-off and follower valves and located in air supply conduits leading from an air cooling tower for water-cooling the feed air to reversing heat exchangers of the system, an expansion turbine for producing chilling necessary for the system, turbine output gas conduits for feeding part of output gas of the expansion turbine to one of the impurity adsorbers through the heat exchangers, regeneration gas conduits for feeding to another adsorber the outflow of the turbine output gas from the first adsorber after heating, and a cooling water circuit for circulating cooling water between a water cooling tower for cooling the coolant water against waste nitrogen gas to be discharged from the system through the heat exchangers and the air cooling tower, the feed air from the air cooling tower being supplied to the heat exchangers in operation through at least one of the impurity adsorbers, while discharging part of the turbine output gas through the remaining adsorbers which are connected in series by the on-off and follower valves and the regenerating gas conduits.

BRIEF DESCRIPTION OF THE DRAWINGS

Various other objects, features and attendant advantages of the present invention will be more fully appreciated as the same becomes better understood from the following detailed description when considered in connection with the accompanying drawings in which like references characters designate like or corresponding parts throughout the several views and wherein.

DETAILED DESCRIPTION OF THE PREFERRED EMBODIMENT

Figure 1:
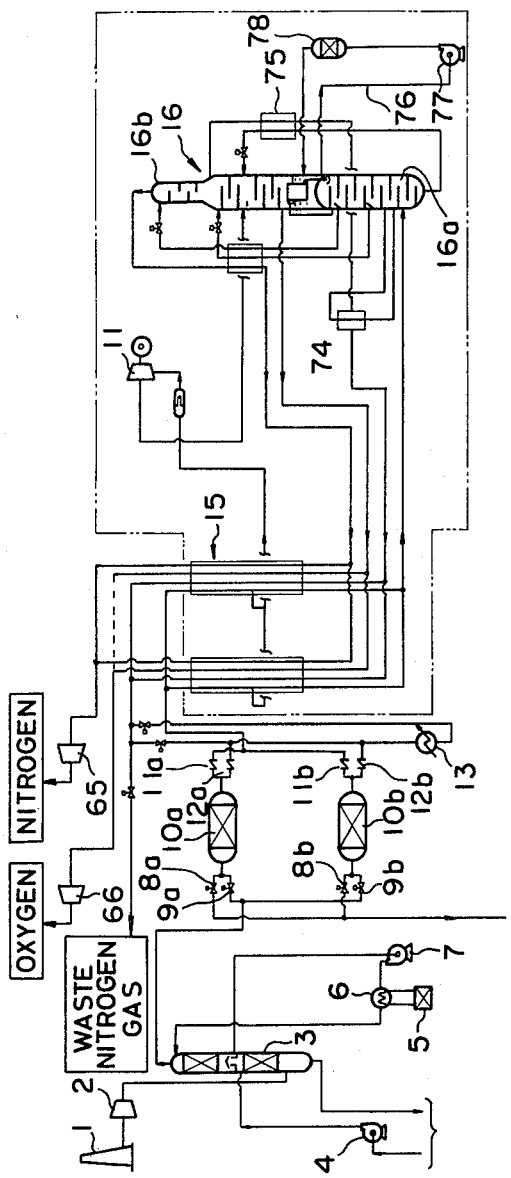
FIG. 1 is a flowchart of a conventional air separation system.
Figure 2:
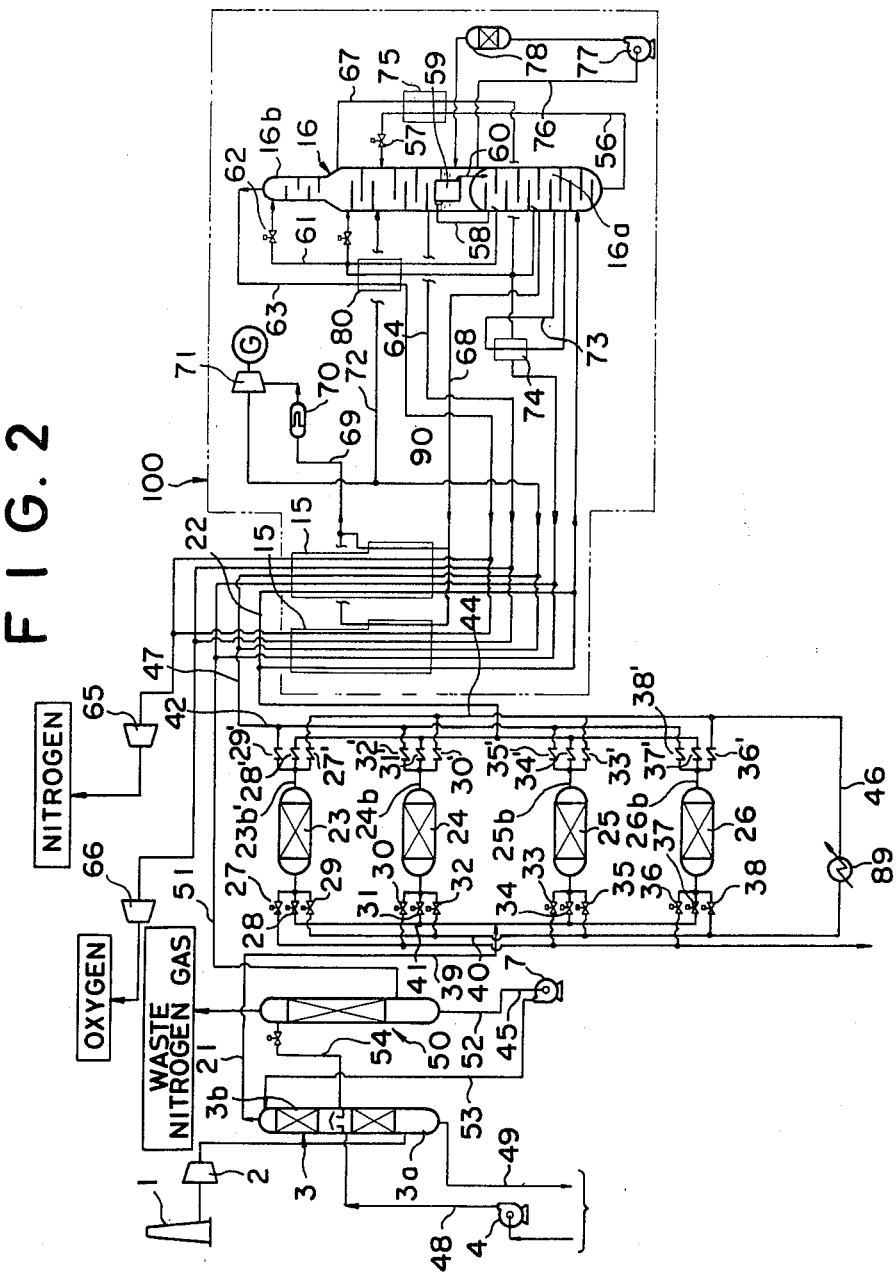
FIG. 2 is a flowchart of an air separation system according to the present invention.

Referring to FIG. 2, there is shown one example of the air separation system for producing oxygen and nitrogen according to the present invention. The air separation system generally indicated by reference number 100 is provided with impurity absorption means which includes four adsorption columns 23 to 26, infeed air conduits 21 and 22 leading to reversing heat exchangers 15 from a air cooling tower 3 which cools the feed air by water-scrubbing. Respective adsorbers 23 to 26 are connected in parallel by on-off valves 27 to 38, follower valves 27' to 38' which are opened and closed in response to on-off valves 27 to 38, respectively, and branch comnduits 39 to 44, and communicable with the raw air feed conduit 21 through a branch conduit 41 which is connected to inlet on-off valves 28, 31, 34 and 37, and with a conduit 45 opening into the atmosphere through a branch conduit 39 which is connected to on-off valves 27, 30, 33 and 36. A branch conduit 40 which is connected to on-off valves 29, 32, 35 and 38 is connected through a regeneration gas conduit 46 to a branch conduit 44 which is connected to follower valves 27', 30', 33' and 36' which are in turn connected to feed air outlets 23b to 26b of the respective adsorbers. A branch conduit 43 which is connected to follower valves 28', 31', 34' and 37' is connected to a feed air conduit 22 which is in turn connected to the heat exchangers 15, and a branch conduit 42 which is connected to follower valves 29', 32', 35' and 38' is connected to an outlet gas conduit 47 of an expansion turbine which is in turn connected to the heat exchangers 15.

On the other hand, air cooling tower 3 is divided into a lower section 3a and an upper section 3b. The cooling water to be used in lower section 3a is fed from outside by a pump 4 through conduit 48 and discharged through conduit 49. The cooling water for upper section 3b is fed to a water cooling tower 50 through passage 54 and cooled in water cooling tower 50 by direct contact with waste nitrogen gas which is discharged from reversing heat exchanger 15 through conduit 51. The cooled water is recirculated to upper section 36 of air cooling tower 3 through a recirculating circuit including conduits 52 and 53 and a pump 7.

In the fractionating operation of the above-described system, the feed air which is sucked through air filter 1 is compressed to a predetermined pressure (about 5 Kg/cm$^2$ G) by air compressor 2 and primarily cooled in lower column 3a of the air cooling tower prior to secondary cooling to 3°-4° C. in upper column 3b. The cooled feed air is supplied through on-off valves 28 and 31 to adsorption columns 23 and 24, for the removal of moisture and impurities like carbon dioxide. The purified feed air is sent to air feed duct 22 through follower valves 28' and 31' and cooled approximately to its dew point in reversing heat exchanger 15 prior to the supply to the lower column 16a for double-column fractionating tower.

The feed air which ascends lower column 16a is fractionated by contact with the reflux liquid and separated into an upper fraction of high-purity nitrogen and a lower fraction of liquefied air rich in oxygen. The liquefied air at the bottom of the lower column is drawn out through conduit 56 and, after heat exchange in cooler 75 against the waste nitrogen gas flowing through conduit 67 through an expansion valve 57, supplied to a middle portion of upper column 16b of the fractionating tower where it is rectified into a top fraction of nitrogen gas and a bottom fraction of liquefied oxygen. The nitrogen at the top end of the lower column of the fractioning tower is fed via conduit 58 to an evaporizer 59 for heat exchange against the liquefied oxygen at the bottom of upper column 16b, the nitrogen gas undergoing condensation and liquefaction while evaporating and gasifying the liquefied oxygen. The liquefied nitrogen is fed through conduit 60 to the top end of lower column 16a as reflux liquid, part of which is supplied to the top end of the upper column through conduit 61 and expansion valve 62 after heat exchange in liquefied nitrogen cooler 80 counter to the product nitrogen gas from the top end of the upper column.

The nitrogen and oxygen gases at the top and bottom of upper column 16b of the fractionating tower are respectively discharged therefrom through conduits 63 and 64 and, after heat exchange in exchangers 15 against the feed air, compressed by compressors 65 and 66 for delivery as products. The impure nitrogen gas (waste nitrogen gas) in the middle portion of upper column 16b is drawn off through conduit 67 and, after heat exchange against the feed air fed to a liquefier 74 from conduit 73, warmed approximately to room temperature in heat exchangers 15 for supply to water cooling tower 50 through conduit 51. The waste nitrogen gas which is a perfectly dried gas of 1°-3° C. is used to cool the cooling water to 3°-4° C. by direct contact therewith in water cooling tower 50 and then released into atmosphere from the top end of the water cooling tower.

On the other hand, part of the feed air which is extracted from the middle portion of lower column 16a of fractionating tower through conduit 68 as a circulating gas of the circulating system is fed to low-temperature sections of heat exchangers 15 to cool the raw feed air and admitted to an expansion turbine 71 through conduit 69 and strainer 70, where the air is subjected reversibly to heat-insulated expansion to produce a chill which is necessary for the system, and divided into halves. One half of the cold air is fed to the middle portion of upper column 16b of fractionating tower through conduit 72, while the other half conducted through conduit 90 is warmed almost to room temperature in reversing heat exchangers 15 and supplied to the adsorber through conduit 47 and follower valve 35' to cool the adsorber and then to a heater 89 through on-off valve 35. The heated air is admitted into adsorption column 26 through follower valve 36' to heat and purge the column and discharged into the atmosphere along with purged impurities through on-off valve 36 and conduit 45. The liquefied oxygen which is extracted from the bottom of upper column 16b of the fractionating tower through conduit 76 by pump 77 is returned to the bottom portion of upper column 16b after removing hydrocarbons in an adsorber 78.

Adsorbers 23 to 26 are alternately switched to establish three cyclic phases of adsorption of impurities in the feed air, purging of impurities from the respective column with heating and cooling (precooling) to the adsorption temperature, thereby permitting continuous operation of the air separating system. In a case where the output gas of the expansion turbine is used as a regeneration gas for the adsorbers as mentioned hereinbefore, it is necessary to increase the turbine output gas pressure in order to guarantee a differential gas pressure for the regeneration of the adsorbers, resulting in a reduction in the chilling production. The decrease in the chilling production due to the increased turbine output pressure can be compensated by increasing the flow rate of the turbine. For example, if the differential gas pressure necessary for the regeneration of the adsorbers is 0.4 Kg/cm$^2$, the turbine output gas pressure has to be raised to 0.65 Kg/cm$^2$ G (from the conventional level of 0.25 Kg/cm$^2$ G). However, according to calculations, the reduction in the chilling production can be compensated by increasing the turbine flow rate by about 15%. In this connection, the turbine flow rate which is approximately 10 to 11% of the feed air in a plant of the scale of about 20,000 Nm$^3$/h(O$_2$) is augmented 11.5 to 13% of the feed air by the increase, with an increase of about 0.5–3% in the amount of the feed air. Therefore, the adsorbers can be regenerated by barely increasing the pressure of the feed air, permitting to reduce the power cost of the compressors of the feed air as compared with conventional couterparts.

In addition, the turbine output gas which has been used for precooling an adsorber which has just undergone the purging of adsorbed impurities with heating is heated for heating another adsorber, so that the calorific power necessary for heating the gas to a required temperature level can be reduced by about 40%. Further, although the regenerating gas is generally used in an amount of about 20% of the feed air, for the regeneration of an adsorber, it is possible to reduce the heating and precooling gas by about 50% in the present invention employing at least three adsorbers which are operated by sequential cycles each consisting of the removal by adsorption of the impurities in the feed gas, purging of impurities from the adsorber with heating, and cooling to the adsorption temperature.

Moreover, since the waste nitrogen which is discharged from the air separating system of the invention is directly contacted with the cooling water to be used for cooling the feed air, the system can dispense with a feed air cooling refrigerator which has thus far been necessary in a case where the product nitrogen and oxygen are collected in equivalent amounts, thus obviating its power cost. Even in a case where the product nitrogen is collected in greater amount, it is possible to reduce the capacity of the refrigerator.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An air separating system, comprising:
   an air cooling tower;
   a plurality of reversing heat exchangers from which nitrogen gas is discharged;
   a plurality of air feed conduits interconnecting said air cooling tower with said reversing heat exchangers for water-cooling air fed to said reversing heat exchangers;
   at least three impurity adsorbers;
   a plurality of on-off valves and a plurality of follower valves interconnecting said impurity adsorbers connected to said air feed conduits leading from said air cooling tower for water-cooling the air feed to reversing heat exchangers of the system to thereby remove impurities from said feed air;
   an expansion turbine for producing chilling necessary for said system;
   a plurality of turbine output gas conduits for feeding part of output gas of said expansion turbine to one said at least three impurity adsorbers through said reversing heat exchangers;
   a plurality of regeneration gas conduits for again feeding to said adsorbers the outflow of the turbine output gas from said adsorbers after heating; and
   a cooling water circuit for circulating cooling water between said water cooling tower for cooling said cooling water against said waste nitrogen gas discharged from said system through said reversing heat exchangers and said air cooling tower, wherein said feed air from said air cooling tower is fed to said reversing heat exchangers in operation through at least one of said three adsorbers while discharging part of said turbine output gas through the remaining adsorbers and wherein the remaining adsorbers are connected in series by said plurality of on-off valves, said plurality of follower valves and said plurality of regenerating gas conduits.

2. An air separating system as set forth in claim 1, wherein said plurality of on-off valves comprise three on-off valves, said plurality of follower valves comprise three follower valves and said three adsorbers include respective feed air inlets and outlets connected via three branch conduits through said three on-off valves and said three follower valves, respectively, and wherein the branch conduits on the air inlet side are connected to a feed air conduit from said air cooling tower, a branch conduit on the air outlet side and a gas exhaust conduit opening into atmosphere, and the remaining branch conduits on the air outlet side of said adsorbers are connected to one of said feed air conduits to said heat exchangers and said turbine output gas conduit.

3. An air separating system as set forth in claim 1 or 2, wherein said three adsorbers comprises three packed adsorption columns.

4. An air separating system as set forth in claim 1 or 2, wherein said three adsorbers further comprise four packed adsorption columns wherein feed air is supplied from said air cooling tower to said heat exchangers through a first pair of said adsorption columns which are connected in parallel through said plurality of on-off and follower valves while releasing part of said turbine output gas through remaining adsorption columns which are connected to said first pair of said adsorption columns in series.

* * * * *

UNITED STATES PATENT AND TRADEMARK OFFICE
CERTIFICATE OF CORRECTION

PATENT NO. : 4,367,082
DATED : January 4, 1983
INVENTOR(S) : YASUSHI TOMISAKA ET AL It is certified that error appears in the above-identified patent and that said Letters Patent is hereby corrected as shown below:

In column 1, line 44, delete "regenerelation" and insert therefor --regeneration--;

In column 2, line 63, delete "comnduits" and insert therefor --conduits--;

In column 3, line 52, delete "fractioning" and insert therefor --fractionating--;

In column 4, line 66, delete "couterparts" and insert therefor --counterparts--;

In column 6, line 2, delete "one".

Signed and Sealed this

Thirteenth Day of March 1984

[SEAL]

Attest:

GERALD J. MOSSINGHOFF

Attesting Officer

Commissioner of Patents and Trademarks